July 30, 1929.　　　G. C. PAPENDICK　　　1,722,338
SLICED BAKED LOAF PACKAGE AND PACKAGING
Filed June 27, 1929　　　2 Sheets-Sheet 2
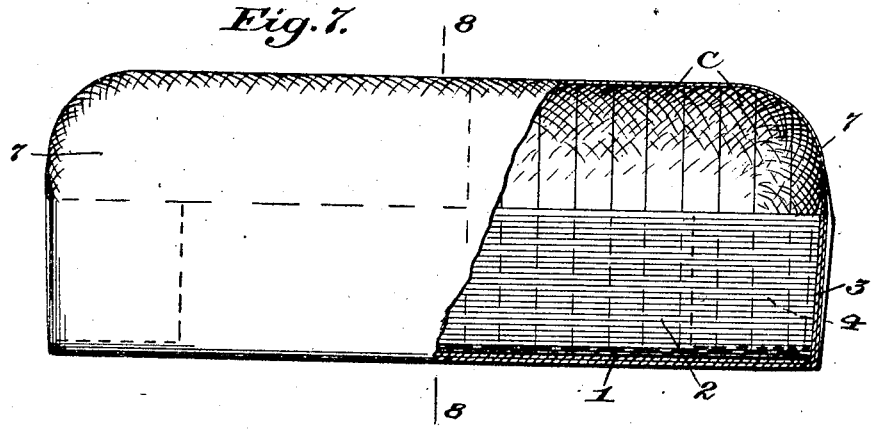
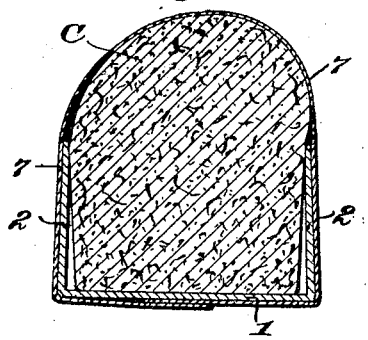
Inventor:
Gustav C. Papendick,
by Ralph Kalish
Atty.

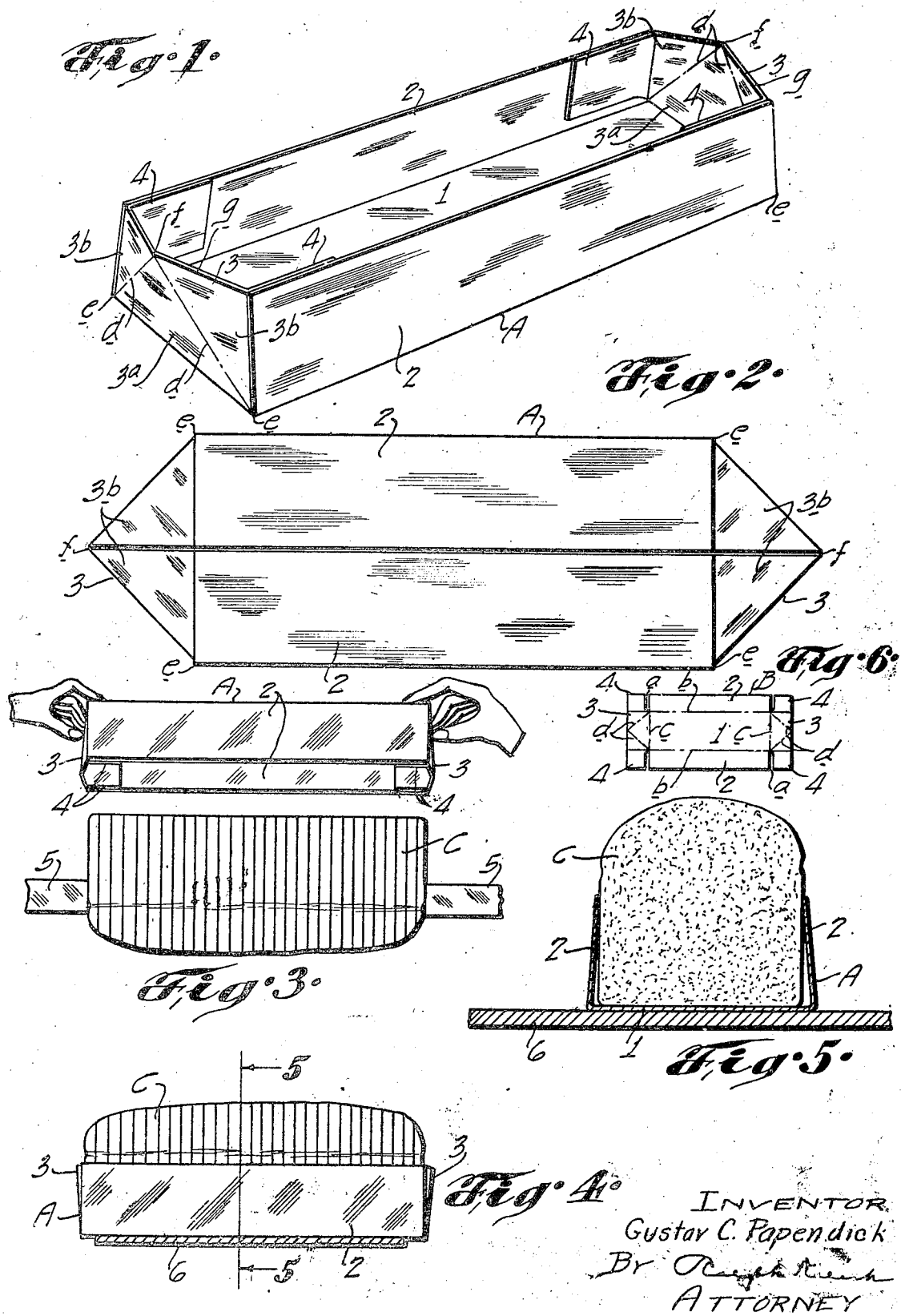

Patented July 30, 1929.

1,722,338

UNITED STATES PATENT OFFICE.

GUSTAV C. PAPENDICK, OF ST. LOUIS, MISSOURI.

SLICED BAKED-LOAF PACKAGE AND PACKAGING.

Application filed June 27, 1929. Serial No. 373,958.

This invention relates to a certain new and useful improvement in sliced baked loaf packages and packaging.

So far as I am aware, while heretofore individually baked articles, such as doughnuts, pretzels, and the like, have been successfully packaged for delivery to the consumer, no attempt to package sliced baked loaves of bread and the like for delivery to the consumer from the bakery plant has heretofore been successful. Hence, notwithstanding the fact that for some years last past so many edible commodities have been supplied to the housewife for immediate service upon her table that it has been long desired that bread also be supplied to her in sliced condition ready for placing upon the table for individual serving, bread has been customarily delivered to the housewife or other person in unsliced or solid loaf form, making it necessary that the loaf before serving be cut into slices, with the consequence that time is consumed in the slicing, the resulting slices are irregular as to thickness, the unconsumed slices more or less quickly become stale and unfit for consumption, and frequently, in the act of slicing, the fingers are injured.

My invention has hence for its object the provision of a new sliced baked loaf package and packaging that meets the long felt want and enables the baker to furnish the housewife or consumer with a baked loaf in a fresh and uniformly sliced or divided condition ready for immediate table service; and with the above and other objects in view, my invention resides in the sliced baked loaf package and in the method of packaging the sliced baked loaf, all as hereinafter described and pointed out in the claims.

In the accompanying drawings:—

Figure 1 is a perspective view of a collapsible tray forming part of my new package, illustrated in unfolded or opened condition with its end walls flexed to draw the side walls yieldingly obliquely together;

Figure 2 is a plan view of the tray in normal collapsed, folded, or closed condition;

Figure 3 is a view illustrating the tray in opened or unfolded condition and about to be applied in containing and holding engagement with the sliced loaf of bread;

Figure 4 is a view illustrating the sliced loaf of bread with the tray positioned thereon and grippingly holding the same, the whole being mounted on a belt conveyor;

Figure 5 is a sectional view along the line 5—5, Figure 4;

Figure 6 is a reduced plan view of the blank from which the tray is constructed;

Figure 7 is a side elevational view of the wrapped and packaged sliced loaf, the wrapper being partly broken away to show the slices and the supporting-tray; and Figure 8 is a vertical sectional view of the wrapped and packaged sliced loaf, taken approximately on the line 8—8, Figure 7.

Referring now more in detail and by reference characters to the drawings, which illustrate a preferred embodiment of my invention, the loaf container or tray A illustrated in Figure 1 is constructed or formed preferably of a single section or blank B of cardboard or other preferably fibrous material, which blank, for the formation of the tray A, is suitably provided with opposed transverse cut-outs $a, a$, adjacent its opposite ends, and with longitudinal and transverse score-lines or zones of weakness $b, b$, and $c, c$, respectively, all disposed as best seen in Figure 6.

The blank B is then suitably folded along the score-lines $b$ and $c$, to define, as an integral whole or unit, a bottom wall 1 and upwardly presented side walls 2, 2, end walls 3, 3, and end-wall flaps 4, 4. The flaps 4, 4, are then disposed inwardly to impinge flatwise upon the end-margin of the side walls 2, to which they are adhesively or otherwise suitably permanently fixed, the whole then forming a box-like vessel of relative dimensions, determined in advance by the selective dimensions of the blank B, for holding a loaf of bread C, as presently appearing. As so formed, the side walls 2 are hingedly conjoined to the bottom wall 1 along the lines $b$, the end walls 3 are hingedly conjoined to the bottom wall 1 along the lines $c$, and the end walls 3 are attached to the side walls 2 by means of the flaps 4, the end walls 3 being, in turn, hingedly conjoined to the flaps 4 and hence also to the side walls 2 along the end portions of the score-lines $b$.

In the formation of the tray or vessel A, however, the end walls 3 are each further scored along diagonal lines to form zones of weakness $d, d$, extending from the opposite corner junctions $e, e$, of the bottom wall 1 with the end walls 3 and meeting, as at $f$, medially the free edge $g$ of the respective end wall 3. The diagonal lines of flexure $d$, $d$, of each end wall 3 thus define a central triangular portion $3^a$ having its apex $f$ at the medial point of the free edge $g$ of the end wall and a pair of oppositely disposed triangular wing portions $3^b$, $3^b$, each conjoined at the respective fold line $d$ to the central portion.

Its end walls 3 being so scored, the tray A is now flattened, as it may be said, upon itself, as seen in Figure 2, to assume its normal collapsed or folded, closed condition, in which folded condition the triangular wing-portions $3^b$ of each end wall 3 are superposed flatwise upon the central triangular portion $3^a$, the tip or apex $f$ of each end wall being presented outwardly, and in which folded condition also, as the end walls are so collapsed or folded, the side walls 2 are pulled or folded inwardly in opposed relation to approximately rest flatwise on the bottom wall 1. In such collapsed condition, the tray A occupies a small space and is very conveniently packed for storage, shipment, and like purposes. For use, however, and in expanding or unfolding the tray, relatively light opposed inward pressure, exerted, for instance, by the fingers or the like, upon the end wall apices $f$ will unfold the end walls 3 and thereby, through the corresponding outward pressure communicated to the side walls 2 by the conjoined end-flaps 4, automatically open or unfold the side walls 2 to open position. However, on pressure on the end walls 3 being removed, the end walls 3, due to their described zones of weakness, automatically have a constant tendency to return to folded or collapsed condition, under the pull of which, assisted or supplemented by the zones of weakness $b$, the side walls 2 assume a yieldingly inwardly and upwardly oblique position relatively to the bottom wall 1.

The tray A is especially adapted as a container for holding the baked loaf after slicing in a shape conformable to the baked loaf prior to the slicing operation. Accordingly, in Figures 3, 4 and 5, the tray is illustrated in connection with certain apparatus employed in the production of sliced baked loaves of bread and the like, in order to clearly demonstrate the functions or purposes of the tray in the finished package.

Referring first to Figure 3, the baked bread loaf C is suitably, after preferably being permitted to somewhat cool, but prior to complete cooling thereof, divided into a multiplicity of individual slices, each such slice having opposed crustless faces. The sliced baked loaf C is now inverted and endwise gripped between members 5—5 of the slicing machine or the conveyor associated therewith. The operator then grasps the folded or collapsed tray A, correspondingly inverts the same, presses inwardly on the end walls 3—3 at their apices $f$ to straighten or unfold the same and thereby, as described, increase the distance between the free margins of the side walls 2—2, and then, while thus holding the tray, places the same over and upon the sliced baked loaf C.

The operator then releases the tray A, whereupon the end walls 3 automatically tend to take their normal flexed condition, causing the side walls 2 to grippingly engage the outer vertical crust-covered side edges of the slices, as clearly shown in Figure 5.

Thereafter, the members 5—5 are released and the tray A carrying the sliced baked loaf is removed from between the members 5—5 and placed right side up on a belt conveyor, as at 6, Figures 4 and 5, for transportation to the wrapping department of the bakery, where the outside wrapper of air- and moisture-proof paper is applied, in a manner common in the art of wrapping unsliced or solid baked loaves and as shown in Figures 7 and 8.

I have found that, when bread is sliced and, in accordance with my invention, then promptly placed in the tray and thereupon also promptly wrapped, the sliced loaf is maintained or preserved in even fresher condition than is the case when an unsliced baked loaf is wrapped and sealed.

In the production of baked bread, the crust cools first, the loaf then cooling progressively inwardly from the crust. In such cooling, there being no escape for the moisture and gas generated within the loaf in the baking process, the crust becomes drier and drier, while the inside moisture gives rise to fermentation, with the result that the loaf becomes, within a comparatively short period of time, moldy and unfit for human consumption. I have discovered, however, that, when bread is sliced in accordance with my invention as described, the resulting crustless faces presented by the slices liberate contained moisture and gas, which thereupon circulate or escape to the outside of the loaf. To now confine such liberated and escaping moisture and gas, the sliced baked loaf is promptly wrapped in the described air- and moisture-proof wrapper, which thereupon functions to confine the escaping moisture and gas about the exterior of the loaf, with the result that, the loaf and its crust being subjected to such liberated gas and moisture, the crust is not only softened but its freshness preserved, and the flavor of the loaf retained. In short, I prevent objectionable collection and retention of trapped gas and moisture in the heart of the loaf where it would give rise to fermentation and utilize these same otherwise objectionable moisture and gas to soften and freshen the outside or crust of the loaf. As the result, a loaf of bread sliced and packaged in accordance with my invention is preserved in an even fresher and more palatable condition for a given length of time than is the case when an unsliced baked loaf is wrapped and sealed in accordance with the now existing common practice.

In such wrapping and sealing of the sliced baked loaf, it is important that the gas and moisture in the heart of the loaf should not be permitted to escape too rapidly to the atmosphere before the wrapper is applied to confine them, else some of the liberated gas and moisture would be lost and would not be available for subsequently preserving the freshness and flavor of the loaf. Hence, promptly upon slicing, the sliced loaf is retained by the members 5 in pre-sliced condition and the tray A promptly disposed thereupon, the tray then functioning to hold or retain the slices with their crustless faces in contiguous complementary loaf-forming relation conformable to the shape of the loaf prior to slicing, it being understood, of course, that the kerfs presented by the slices provide sufficient space for the escape of the liberated gas and moisture. In short, the tray, in addition to its other functions, such as facilitating wrapping of the sliced loaf, etc., serves to regulate the liberation of gas and moisture from the inside of the loaf, so as to prevent too rapid escape thereof prior to wrapping, but nevertheless to permit escape to the zone surrounding the loaf and inside the wrapper when the wrapper is applied.

It will readily be understood that the sliced baked loaf C thus held and retained in its original baked shape by the tray A and the wrapper may be handled as a unit in a highly convenient and practical manner. Furthermore, in accordance with my invention, my new sliced baked loaf package is in compact form, convenient for commercial transportation and delivery, and the sliced baked loaf is protected from contamination, is ready for immediate service upon the table, and when the outside wrapper is removed, the several slices may be selectively individually taken from the tray without affecting or requiring any handling of the remaining slices, with the result that the sliced baked loaf as presented upon the table is fresh, highly edible, and appetizing.

The present application is filed as a continuation in part of my co-pending application Serial No. 317,390, filed November 5, 1928, which is being abandoned in favor of the present application, it being understood, however, that none of the features of invention disclosed in said application Serial No. 317,390 is being abandoned.

It is to be understood further that changes or modifications in the form, construction, arrangement, and combination of the several parts of my new loaf package and in the method of wrapping and packaging the contained and supported sliced loaf may be made and substituted for those herein shown and described without departing from the nature and principle of my invention, as defined in the appended claims.

Having thus described my invention, what I claim and desire to secure by Letters Patent is:

1. A bread loaf package comprising, in combination, an open-top tray for receiving a sliced baked loaf of bread and retaining it in substantially its pre-sliced baked form and provided with means biased inwardly for yieldingly engaging the side edges of the slices, and a wrapper surrounding and engaging the tray and its contents for retaining the sliced loaf in the tray and for protecting the sliced loaf.

2. The method of preparing a sliced baked loaf of bread for delivery to the user in unmutilated, attractive and palatable condition, which comprises uniformly slicing the baked loaf of bread, confining the sliced and otherwise unmutilated loaf in an open-top tray, said tray having inwardly biased side walls to hold the slices in assembled relation with the upper part of the sliced loaf extending above the tray and with the side edges of the slices gripped by the biased sides of the tray, and wrapping the tray and its contained sliced loaf to prevent derangement of the latter in the tray during delivery.

3. The method of packaging a baked loaf of bread which consists in first dividing the baked loaf while warm and moist inside into a multiplicity of slices, thereby providing a plurality of crustless surfaces and permitting gas and moisture to be liberated from the interior of the loaf to circulate to the exterior, then disposing the sliced baked loaf in a supporting tray for confining the slices with their adjacent crustless surfaces in contiguous relation, and then sealing the whole in a moisture and air-proof wrapper, thereby confining the liberated gas and moisture for utilizing the same in preserving the freshness of the loaf.

4. The method of packaging a baked loaf of bread of substantially rectangular form, which consists in cutting the loaf while warm and moist inside into substantially uniform slices, thereby providing a plurality of crustless surfaces and permitting gas and moisture to be liberated from the interior of the loaf to circulate to the exterior, placing the sliced loaf into a tray of stiff, resilient material of substantially the rectangular dimensions of the baked loaf with its walls engaging the sliced loaf to maintain the slices in compact loaf form with their crustless surfaces in contiguous relation, and then placing a wrapper of substantially moisture and air-proof material around and in contact with the tray and its contained sliced loaf, thereby retaining them in assembled condition and confining the liberated gas and moisture for utilizing the same in preserving the freshness of the loaf.

5. A loaf package for maintaining a baked loaf of bread fresher than a similarly packaged whole loaf of the same kind of bread of equal age, said loaf package comprising, in combination, a baked loaf of bread sliced while warm and moist inside, a tray maintaining the slices in assembled relation after slicing, and a wrapper surrounding the sliced loaf and said tray and preventing the escape of vapor from the sliced loaf from the time of wrapping the sliced baked loaf until the wrapper is broken.

In testimony whereof, I have signed my name to this specification.

GUSTAV C. PAPENDICK.